(12) United States Patent
Hancu et al.

(10) Patent No.: US 9,375,710 B2
(45) Date of Patent: Jun. 28, 2016

(54) CATALYST AND METHOD OF MANUFACTURE

(71) Applicant: General Electric Company, Schenectady, NY (US)

(72) Inventors: Dan Hancu, Clifton Park, NY (US); Whisenhunt Wayne Donald, Jr., Niskayuna, NY (US); Winkler Hale Benjamin, Albany, NY (US); Wood Rue Benjamin, Niskayuna, NY (US); Keshavan Hrishikesh, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/552,409

(22) Filed: Nov. 24, 2014

(65) Prior Publication Data

US 2015/0151291 A1 Jun. 4, 2015

Related U.S. Application Data

(63) Continuation-in-part of application No. 14/311,219, filed on Jun. 20, 2014, which is a continuation-in-part of application No. 12/789,592, filed on May 28, 2010, now Pat. No. 8,871,669, which is a (Continued)

(51) Int. Cl.
*B01J 29/00* (2006.01)
*B01J 29/04* (2006.01)
(Continued)

(52) U.S. Cl.
CPC .............. *B01J 35/1019* (2013.01); *B01J 21/04* (2013.01); *B01J 23/50* (2013.01); *B01J 23/74* (2013.01); *B01J 29/072* (2013.01); *B01J 29/65* (2013.01); *B01J 35/0006* (2013.01); *B01J 35/1061* (2013.01); *B01J 37/04* (2013.01); *C01B 21/0422* (2013.01); *B01D 53/9418* (2013.01); *B01D 2255/104* (2013.01); *B01D 2255/106* (2013.01); *B01D 2255/1021* (2013.01); *B01D 2255/1023* (2013.01); *B01D 2255/1026* (2013.01); *B01D 2255/1028* (2013.01); *B01D 2255/2092* (2013.01); *B01D 2255/20723* (2013.01); *B01D 2255/20738* (2013.01);

(Continued)

(58) Field of Classification Search
CPC ............ B01J 21/04; B01J 23/50; B01J 29/65; B01J 35/1019; B01J 35/04
USPC ....................... 502/60, 63, 64, 66, 73, 74, 348
See application file for complete search history.

(56) References Cited

U.S. PATENT DOCUMENTS 4,480,050 A 10/1984 Brennan
5,244,852 A 9/1993 Lachman (Continued)

FOREIGN PATENT DOCUMENTS

DE 4128629 8/1999
EP 0577438 5/1994

(Continued)

*Primary Examiner* — Cam N. Nguyen
(74) *Attorney, Agent, or Firm* — Joseph J. Christian (57) ABSTRACT

Disclosed herein is a catalytic composition comprising a first catalyst composition portion that comprises a zeolite; and a second catalyst composition portion that comprises a catalytic metal disposed upon a porous inorganic substrate; the first catalyst composition portion and the second catalyst composition portion being in an intimate mixture.

16 Claims, 6 Drawing Sheets

Related U.S. Application Data continuation-in-part of application No. 12/123,070, filed on May 19, 2008, now Pat. No. 8,530,369, said application No. 14/311,219 is a continuation-in-part of application No. 12/550,916, filed on Aug. 31, 2009, now abandoned, application No. 14/552,409, which is a continuation-in-part of application No. 12/474,873, filed on May 29, 2009, now abandoned, which is a continuation-in-part of application No. 12/173,492, filed on Jul. 15, 2008, now abandoned.

(60) Provisional application No. 60/994,447, filed on Sep. 19, 2007, provisional application No. 60/994,448, filed on Sep. 19, 2007.

(51) Int. Cl.

| | | |
|---|---|---|
| *B01J 29/06* | (2006.01) | |
| *B01J 21/00* | (2006.01) | |
| *B01J 23/48* | (2006.01) | |
| *B01J 23/50* | (2006.01) | |
| *B01J 35/10* | (2006.01) | |
| *B01J 29/65* | (2006.01) | |
| *B01J 21/04* | (2006.01) | |
| *B01J 23/74* | (2006.01) | |
| *B01J 37/04* | (2006.01) | |
| *B01J 35/00* | (2006.01) | |
| *B01J 29/072* | (2006.01) | |
| *C01B 21/04* | (2006.01) | |
| *B01D 53/94* | (2006.01) | |

(52) U.S. Cl.
CPC .......... *B01D 2255/20746* (2013.01); *B01D 2255/20753* (2013.01); *B01D 2255/20769* (2013.01); *B01D 2255/20776* (2013.01); *B01D 2255/20792* (2013.01); *B01D 2255/502* (2013.01); *B01D 2255/504* (2013.01); *B01D 2255/9205* (2013.01); *B01D 2255/9207* (2013.01); *B01D 2257/404* (2013.01); *B01D 2258/012* (2013.01)

(56) References Cited

U.S. PATENT DOCUMENTS

| | | | |
|---|---|---|---|
| 5,510,306 A | 4/1996 | Murray | |
| 5,609,839 A | 3/1997 | Itoh | |
| 5,750,459 A | 5/1998 | Marella | |
| 5,770,778 A | 6/1998 | Naujokas | |
| 5,772,972 A | 6/1998 | Hepburn | |
| 5,795,559 A | 8/1998 | Pinnavaia | |
| 5,802,845 A | 9/1998 | Abe | |
| 5,879,645 A | 3/1999 | Park | |
| 5,911,966 A | 6/1999 | Muller | |
| 6,042,797 A * | 3/2000 | Ogawa | B01D 53/9486 423/213.2 |
| 6,093,378 A * | 7/2000 | Deeba | B01D 53/945 423/213.5 |
| 6,103,208 A * | 8/2000 | Ogawa | B01D 53/9486 423/213.2 |
| 6,146,602 A | 11/2000 | Narula | |
| 6,147,023 A * | 11/2000 | Hirayama | B01D 53/9481 502/64 |
| 6,284,211 B1 | 9/2001 | Miyadera | |
| 6,309,616 B1 * | 10/2001 | Ogawa | B01D 53/9486 423/213.2 |
| 6,703,343 B2 | 3/2004 | Park | |
| 6,881,390 B2 | 4/2005 | Yaluris | |
| 6,936,232 B2 | 8/2005 | Gillespie | |
| 7,045,485 B2 | 5/2006 | Kelker | |
| 7,081,231 B1 | 7/2006 | Aardahl | |
| 7,132,165 B2 | 11/2006 | Pinnavaia et al. | |
| 7,214,643 B2 | 5/2007 | Yamamoto | |
| 7,371,358 B2 | 5/2008 | Upchurch | |
| 7,374,728 B2 * | 5/2008 | Nakanishi | B01D 53/945 422/168 |
| 7,419,647 B2 * | 9/2008 | Liu | B01D 53/944 423/385 |
| 7,431,905 B2 | 10/2008 | Hancu | |
| 7,485,271 B2 | 2/2009 | Golunski | |
| 7,494,634 B2 | 2/2009 | Vitse | |
| 7,612,011 B2 | 11/2009 | Vanderspurt et al. | |
| 7,655,203 B2 | 2/2010 | Hancu | |
| 7,709,414 B2 | 5/2010 | Fujdala | |
| 7,803,338 B2 | 9/2010 | Socha | |
| 7,867,598 B2 | 1/2011 | Miyairi | |
| 7,927,551 B2 * | 4/2011 | Miyairi | B01D 53/945 264/42 |
| 8,034,311 B2 | 10/2011 | Ikeda | |
| 8,037,674 B2 | 10/2011 | Kupe | |
| 8,062,991 B2 | 11/2011 | Male et al. | |
| 8,101,145 B1 | 1/2012 | Norton | |
| 8,353,155 B2 | 1/2013 | Lewis et al. | |
| 8,476,187 B2 | 7/2013 | Norton et al. | |
| 8,505,285 B2 | 8/2013 | Winkler et al. | |
| 8,530,369 B2 | 9/2013 | Lewis et al. | |
| 8,586,501 B2 | 11/2013 | Lewis | |
| 8,802,582 B2 * | 8/2014 | Malyala | B01D 53/9418 502/63 |
| 2002/0094314 A1 * | 7/2002 | Miyadera | B01D 53/8628 423/239.1 |
| 2003/0118960 A1 | 6/2003 | Park | |
| 2003/0134745 A1 | 7/2003 | Park | |
| 2003/0176280 A1 | 9/2003 | Caze | |
| 2004/0175306 A1 * | 9/2004 | Nakanishi | B01D 53/945 422/186.04 |
| 2005/0135980 A1 | 6/2005 | Park | |
| 2005/0198092 A1 | 9/2005 | Shen | |
| 2006/0009349 A1 | 1/2006 | Fujimoto | |
| 2006/0075742 A1 | 4/2006 | Lee | |
| 2006/0133976 A1 | 6/2006 | Male | |
| 2006/0228283 A1 * | 10/2006 | Malyala | B01D 53/8625 423/239.1 |
| 2007/0059223 A1 | 3/2007 | Golunski | |
| 2007/0101704 A1 | 5/2007 | Goulette | |
| 2007/0149385 A1 | 6/2007 | Liu | |
| 2008/0020925 A1 | 1/2008 | Larcher | |
| 2008/0053073 A1 | 3/2008 | Kalyanaraman | |
| 2008/0085231 A1 | 4/2008 | Vitse | |
| 2008/0124264 A1 | 5/2008 | Ikeda | |
| 2008/0131345 A1 | 6/2008 | Vitse | |
| 2008/0141660 A1 | 6/2008 | Kim | |
| 2009/0004079 A1 | 1/2009 | Hancu | |
| 2009/0074641 A1 | 3/2009 | Lewis | |
| 2009/0075813 A1 | 3/2009 | Whisenhunt | |
| 2009/0263297 A1 | 10/2009 | Hancu | |
| 2009/0318283 A1 | 12/2009 | Keshavan | |
| 2010/0095591 A1 | 4/2010 | Hancu | |
| 2010/0143227 A1 | 6/2010 | Keshavan et al. | |
| 2010/0150801 A1 | 6/2010 | Keshavan et al. | |
| 2010/0196236 A1 | 8/2010 | Lewis et al. | |
| 2010/0196237 A1 | 8/2010 | Yin et al. | |
| 2010/0233053 A1 | 9/2010 | Lewis et al. | |
| 2011/0047988 A1 | 3/2011 | Lewis et al. | |
| 2011/0047995 A1 | 3/2011 | Lewis | |
| 2011/0120100 A1 | 5/2011 | Yin et al. | |
| 2011/0152064 A1 | 6/2011 | Keshavan et al. | |
| 2011/0152068 A1 | 6/2011 | Keshavan et al. | |
| 2011/0166015 A1 | 7/2011 | Norton | |
| 2011/0209466 A1 | 9/2011 | Yin et al. | |
| 2012/0047877 A1 | 3/2012 | Winkler | |
| 2012/0082606 A1 | 4/2012 | Lewis et al. | |
| 2012/0093703 A1 | 4/2012 | Lewis et al. | |
| 2012/0329644 A1 | 12/2012 | Siclovan et al. | |
| 2013/0129575 A1 | 5/2013 | Lewis et al. | |

FOREIGN PATENT DOCUMENTS

| | | |
|---|---|---|
| EP | 0207550 | 9/1995 |
| EP | 0714693 | 6/1996 |
| EP | 0787522 | 8/1997 |
| EP | 0947236 | 10/1999 |

(56) References Cited

FOREIGN PATENT DOCUMENTS

| | | |
|---|---|---|
| EP | 1029582 | 8/2000 |
| EP | 0895812 | 7/2003 |
| EP | 0914864 | 8/2007 |
| EP | 1832345 | 9/2007 |
| EP | 1944075 | 7/2008 |
| FR | 2842419 | 1/2004 |
| JP | 4354536 | 8/1992 |
| JP | 6126134 | 5/1994 |
| JP | 06343829 | 12/1994 |
| WO | 9929400 | 6/1999 |
| WO | 2005035108 | 4/2005 |
| WO | 2006027998 | 3/2006 |
| WO | 2006093802 | 9/2006 |
| WO | 2007049851 | 5/2007 |
| WO | 2009038855 | 3/2009 |
| WO | 2009038901 | 3/2009 |
| WO | 2011084484 | 7/2011 |

* cited by examiner

CATALYST AND METHOD OF MANUFACTURE

TECHNICAL FIELD

The systems and techniques described include embodiments that relate to catalysts. They also include embodiments that relate to the making of catalysts and systems that may include catalysts.

DISCUSSION OF RELATED ART

Exhaust streams generated by the combustion of fossil fuels, such as in furnaces, ovens, and engines, contain various potentially undesirable combustion products including nitrogen oxides (NOx), unburned hydrocarbons (HC), and carbon monoxide (CO). NOx, though thermodynamically unstable, may not spontaneously decompose in the absence of a catalyst. Exhaust streams may employ exhaust treatment devices to remove NOx from the exhaust stream.

Examples of exhaust treatment devices include: catalytic converters (e.g., three-way catalyst, oxidation catalysts, selective catalytic reduction (SCR) catalysts, and the like), evaporative emissions devices, scrubbing devices (e.g., hydrocarbon (HC), sulfur, and the like), particulate filters/traps, absorbers/absorbers, plasma reactors (e.g., non-thermal plasma reactors and thermal plasma reactors), and the like. A three-way catalyst (TWC catalyst) in a catalytic converter may reduce NOx by using CO and residual hydrocarbon. TWC catalysts may be effective over a specific operating range of both lean and rich fuel/air conditions and within a specific operating temperature range.

Particulate catalyst compositions may enable optimization of the conversion of HC, CO, and NOx. The conversion rate may depend on the exhaust gas temperature. The catalytic converter may operate at an elevated catalyst temperature of about 300 degrees Celsius or higher. The time period between when the exhaust emissions begin (i.e., "cold start"), until the time when the substrate heats up to a light-off temperature, is the light-off time. Light-off temperature is the catalyst temperature at which fifty percent (50%) of the emissions from the engine convert as they pass through the catalyst.

The exhaust gases from the engine may heat the catalytic converter. This heating may help bring the catalyst to light-off temperature. The exhaust gases pass through the catalytic converter relatively unchanged until the light-off temperature is reached. In addition, the composition of the engine exhaust gas changes as the engine temperature increases from a cold start temperature to an operating temperature, and the TWC catalyst may work with the exhaust gas composition that is present at normal elevated engine operating temperatures.

Selective Catalytic Reduction (SCR) may include a noble metal system, base metal system, or zeolite system. The noble metal catalyst may operate in a temperature regime of from about 240 degrees Celsius to about 270 degrees Celsius, but may be inhibited by the presence of $SO_2$. The base metal catalysts may operate in a temperature range of from about 310 degrees Celsius to about 400 degrees Celsius, but may promote oxidation of $SO_2$ to $SO_3$. The zeolites can withstand temperatures up to 600 degrees Celsius and, when impregnated with a base metal may have a wide range of operating temperatures.

SCR systems with ammonia as a reductant may yield NOx reduction efficiencies of more than 80% in large natural gas fired turbine engines, and in lean burn diesel engines. However, the presence of ammonia may be undesirable, and there may be some ammonia slip due to imperfect distribution of reacting gases.

Selective Catalytic Reduction with hydrocarbons may reduce NOx emissions. NOx can be selectively reduced by some organic compounds (e.g. alkanes, olefins, alcohols) over several catalysts under excess $O_2$ conditions. The injection of diesel or methanol has been explored in heavy-duty stationary diesel engines to supplement the HCs in the exhaust stream. However, the conversion efficiency may be reduced outside the temperature range of 300 degrees Celsius to 400 degrees Celsius. In addition, this technique may have HC-slippage over the catalyst, transportation and on-site bulk storage of hydrocarbons, and possible atmospheric release of the HC. The partial oxidation of hydrocarbons may release CO, unburned HC, and particulates.

It may be desirable to have a catalyst that can effect emission reduction across a range of temperatures and operating conditions that differ from those currently available. It may also be desirable to have a catalyst that can effect NOx reduction using a reductant is different than the currently used reductants.

The following applications disclose a variety of catalyst compositions and methods of producing such compositions. Each of these applications is herein incorporated by reference in their entirety.

Published applications 20090075813 (227198-2) is based on Ser. No. 12/173,492 and 20090263297 (227198-4) is based on Ser. No. 12/474,873. These applications relate to a catalytic composition comprising: a first catalyst composition portion that comprises a zeolite; and a second catalyst composition portion that comprises a catalytic metal disposed on a surface of a porous inorganic substrate, and the first catalyst composition portion and the second catalyst composition portion form an intimate mixture. Related WO/2009/038901 (227198) discloses a catalytic composition comprising a first catalyst composition portion that comprises a zeolite: and a second catalyst composition portion that comprises a catalytic metal disposed upon a porous inorganic substrate.

Published application 20090074641 (227520-2), herein incorporated by reference in its entirety, relates to a mesoporous substrate that is a reaction product of a reactive solution, a solvent, a modifier, and a templating agent. Published application 20100233053 (227520-6) discloses a method comprising: reacting a reactive solution and a templating agent to form a gel; and calcining the gel to form a catalyst composition comprising a homogeneous solid mixture containing: (i) at least one catalytic metal, and (ii) at least one metal inorganic network; wherein the templating agent comprises an octylphenol ethoxylate having a particular structure.

Published applications 20100196236 (233866-1), 20100196237 (233930-1) disclose compositions that include a templated metal oxide substrate having a plurality of pores and a catalyst material that includes silver.

Published applications 20110166015 (235355-1), 20110152064 (235373-2), 20110152068 (235373-1) and related WO/2011/084484 (235373) disclose processes for producing catalyst powders using slurries that include templating agents.

Published application 20110047988 (238042-1) relates to a catalyst system comprising a first catalytic composition comprising a first catalytic material disposed on a metal inorganic support; wherein the metal inorganic support has pores; and at least one promoting metal.

Published application 20120082606 (242743-1) discloses a catalyst composition includes a catalytic metal secured to a porous substrate. The substrate has pores that are templated.

Published application 20110120100 (235722-1) relates to a catalyst system comprising a first catalytic composition comprising a homogeneous solid mixture containing at least one catalytic metal and at least one metal inorganic support.

Published application 20110047995 (238043-1) is based on Ser. No. 12/550,916. This application and copending Ser. No. 14/311,219 disclose a catalyst system comprising: a first catalytic composition comprising; (i) a first component comprising a zeolite, and (ii) a second component comprising a homogeneous solid mixture containing at least one catalytic metal and at least one metal inorganic support.

Published application 20120093703 (242661-01) relates to a catalyst composition includes a catalytic metal secured to a porous substrate.

Published application 20110209466 (239233-1) discloses a catalyst composition that includes a templated metal oxide substrate and a catalyst material. The templated metal oxide substrate comprises yttrium and has a plurality of pores.

Published application 20100143227 (229285-1) relates to a catalyst comprising: a binder; and a catalytic composition, comprising: a first catalyst composition that comprises a zeolite; and a second catalyst composition that comprises a catalytic metal disposed upon a porous inorganic material, wherein the catalyst comprising the binder and catalytic composition is in the form of an extrudate or foam.

Published application 20100150801 (229285-2) discloses a formed catalyst comprising a binder, a zeolite, and a catalytic metal disposed on a porous inorganic material. The zeolite domains in the formed catalyst are substantially free of the catalytic metal.

Each of the above applications is herein incorporated by reference herein in its entirety.

BRIEF DESCRIPTION

In one embodiment of the system described herein, a catalyst system comprising a first catalyst composition and a second catalyst composition is provided. The first catalyst composition is a zeolite, and the second catalyst composition includes a catalytic metal disposed on a porous inorganic substrate. The first and second catalyst compositions are in an intimate mixture.

In a further aspect of such systems, the system includes an exhaust gas stream that flows over the surface of the intimate mixture. A reductant may be introduced into the gas stream upstream of the intimate mixture.

In yet another aspect of such systems, the system reduces the nitrogen oxide concentration in the exhaust gas stream.

DETAILED DESCRIPTION

The systems and techniques described include embodiments that relate to catalysts and their use and manufacture. Other embodiments relate to articles that include catalysts and catalytic compositions that may chemically reduce NOx that is present in emissions generated during combustion, for example in furnaces, ovens, engines, and locomotives.

In one embodiment, the catalytic composition may include a first catalyst composition portion and a second catalyst composition portion that are mixed together. The first catalyst composition portion and the second catalyst composition portion may be intimately mixed together. The mixed catalytic composition may reduce the NOx present in emissions generated during combustion when in contact therewith. The mixed catalytic composition may reduce a larger amount of NOx in an emissions stream relative to a similar catalytic composition that is not intimately mixed together. The term "intimately" or "intimate" as it relates to the mixing of the first catalyst composition portion and the second catalyst composition portion is intended to mean that a portion of the respective compositions are in particulate form and the particulates are in physical contact with one another.

The first catalyst composition portion includes a zeolite while the second catalyst composition portion includes a catalytic metal disposed upon a porous substrate. The porous substrate includes an inorganic material that can be a metal oxide, an inorganic oxide, an inorganic carbide, an inorganic nitride, an inorganic hydroxide, an inorganic oxide having a hydroxide coating, an inorganic carbonitride, an inorganic oxynitride, an inorganic boride, an inorganic borocarbide, or the like, or a combination including at least one of the foregoing inorganic materials. When the catalytic composition is employed to reduce NOx generated in emissions from furnaces, ovens, locomotives and engines, a variety of hydrocarbons can be effectively used as a reductant. In an exemplary embodiment, diesel can be used as a reductant. The catalytic composition can reduce NOx while using higher hydrocarbons having from about 5 to about 9 carbon atoms per molecule as a reductant. The catalyst advantageously functions across a variety of temperature ranges. Suitable temperature ranges may include temperatures of greater than about 325 degrees Celsius. Other temperatures ranges may include those up to about 400 degrees Celsius.

The first catalyst composition portion may include a zeolite. In one embodiment, the zeolite is metal free, i.e., the zeolite contains no metal ions and is not doped with a metal. The zeolites may be naturally occurring or synthetic. Examples of suitable zeolites are zeolite Y, zeolite beta, ferrierite, mordenite, ZSM-5, or the like, or a combination including at least one of the foregoing zeolites. In one embodiment, the first catalyst composition portion consists essentially of ferrierite.

Another zeolite that may be used is a ferrierite having a silicon to aluminum ratio of about 10 to about 30. In one embodiment, the ferrierite has a silicon to aluminum ratio of about 12 to about 15, about 15 to about 17, about 17 to about 20, about 20 to about 23, about 23 to about 25, or greater than about 25.

Examples of commercially available zeolites that may be used in the first catalyst composition portion are marketed under the following trademarks: CBV100, CBV300, CBV400, CBV500, CBV600, CBV712, CBV720, CBV760, CBV780, CBV901, CP814E, CP814C, CP811C-300, CP914, CP914C, CBV2314, CBV3024E, CBV5524G, CBV8014, CBV28014, CBV10A, CBV21A, CBV90A, or the like, or a combination including at least one of the foregoing commercially available zeolites.

An average catalytic composition particle size is less than about 100 nanometers. In one embodiment, the average catalytic composition particle size is in a range of from about 0.1 nanometers to about 1 nanometer, from about 1 nanometer to about 5 nanometers, from about 5 nanometers to about 15 nanometers, from about 15 nanometers to about 25 nanometers, from about 25 nanometers to about 50 nanometers, or greater than about 50 nanometers.

The zeolite particles are in the form of extrudates and generally have an average particle size up to about 1.60 millimeters. In one embodiment, the zeolite particles have an average particle size of about 0.001 millimeters to about 0.1 millimeters, about 0.1 millimeters to about 0.5 millimeters, about 0.5 millimeters to about 0.8 millimeters, about 0.8 millimeters to about 1.1 millimeters, or greater than about 1.1 millimeters. In an exemplary embodiment, the zeolite particles have an average particle size of about 0.001 millimeter.

The zeolite particles may have a surface area of up to about 600 square meters per gram ($m^2/gm$). In one embodiment, the zeolite particles may have a surface area in a range of from about 50 $m^2/gm$ to about 100 $m^2/gm$, from about 100/gm to about 200/gm, from about 200/gm to about 300/gm, from about 300/gm to about 400 $m^2/gm$, from about 400 $m^2/gm$ to about 500 $m^2/gm$, or greater than about 500 $m^2/gm$.

The first catalyst composition portion may be present in an amount of up to about 80 wt %, based upon the total weight of the catalytic composition. In one embodiment, the first catalyst composition portion may be present in an amount in a range of from about 20 wt % to about 30 wt %, from about 30 wt % to about 40 wt %, from about 40 wt % to about 50 wt %, from about 50 wt % to about 60 wt %, from about 60 wt % to about 70 wt %, or greater than about 70 wt %, based upon the total weight of the catalytic composition.

As noted above, the second catalyst composition portion includes a metal disposed upon a porous substrate. The porous substrate is an inorganic material that can be a metal oxide, an inorganic oxide, an inorganic carbide, an inorganic nitride, an inorganic hydroxide, an inorganic oxide having a hydroxide coating, an inorganic carbonitride, an inorganic oxynitride, an inorganic boride, an inorganic borocarbides, or the like, or a combination including at least one of the foregoing inorganic materials. In one embodiment, the porous substrate consists essentially of a metal oxide or an inorganic oxide.

Examples of suitable inorganic oxides include silica ($SiO_2$), alumina ($Al_2O_3$), titania ($TiO_2$), zirconia ($ZrO_2$), yttria ($Y_2O_3$), ceria ($CeO_2$), manganese oxide ($MnO_2$), zinc oxide (ZnO), iron oxides (e.g., FeO, beta-$Fe_2O_3$, gamma-$Fe_2O_3$, epsilon-$Fe_2O_3$, $Fe_3O_4$, or the like), calcium oxide (CaO), manganese dioxide ($MnO_2$ and $Mn_3O_4$), or combinations including at least one of the foregoing inorganic oxides. Examples of inorganic carbides include silicon carbide (SiC), titanium carbide (TiC), tantalum carbide (TaC), tungsten carbide (WC), hafnium carbide (HfC), or the like, or a combination including at least one of the foregoing carbides. Examples of suitable nitrides include silicon nitrides ($Si_3N_4$), titanium nitride (TiN), or the like, or a combination including at least one of the foregoing. Examples of suitable borides are lanthanum boride ($LaB_6$), chromium borides (CrB and $CrB_2$), molybdenum borides ($MoB_2$, $Mo_2B_5$ and MoB), tungsten boride ($W_2B_5$), or the like, or combinations including at least one of the foregoing borides. In one embodiment, the porous substrate consists essentially of alumina.

In another embodiment, the porous substrate includes one or more stabilizers, which may be added to the primary substrate. For example, in various embodiments, a substrate comprising predominantly alumina has smaller amounts of yttria, zirconia, or ceria added to it.

The porous substrate may have a surface area of up to about 2,000 square meters per gram ($m^2/gm$). In one embodiment, the porous substrate may have a surface area in a range of from about 20 $m^2/gm$ to about 100 $m^2/gm$, from about 100/gm to about 200/gm, from about 200/gm to about 400/gm, from about 400/gm to about 600 $m^2/gm$, from about 600 $m^2/gm$ to about 800 $m^2/gm$, from about 800 $m^2/gm$ to about 1,000 $m^2/gm$, from about 1,000 $m^2/gm$ to about 1,200 $m^2/gm$, from about 1,200 $m^2/gm$ to about 1,600 $m^2/gm$, or greater than about 1,600 $m^2/gm$.

The porous substrate may be in the form of particles. The particles may be agglomerates, a sintered mass, a surface coating on a support, or the like. The porous substrate may have an average particle size of up to about 4 millimeters. In one embodiment, the porous inorganic materials may have an average particle in a range of from about 5 micrometers to about 50 micrometers, from about 50 micrometers to about 100 micrometers, from about 100 micrometers to about 500 micrometers, from about 500 micrometers to about 1 millimeter, from about 1 millimeter to about 2 millimeters, from about 2 millimeters to about 3 millimeters, or greater than about 3 millimeters. In an exemplary embodiment, the porous substrate has an average particle size of about 40 micrometers.

The catalytic metal may include alkali metals, alkaline earth metals, transition metals and main group metals. Examples of suitable catalytic metals are silver, platinum, gold, palladium, iron, nickel, cobalt, gallium, indium, ruthenium, rhodium, osmium, iridium, or the like, or a combination including at least one of the foregoing metals. In one embodiment, the catalytic metal consists essentially of silver.

The average catalytic metal particle size may be up to about 50 nanometers. In one embodiment, the average catalytic metal particle size is about 1 nanometer to about 5 nanometers, about 5 to about 10 nanometers, about 10 to about 20 nanometers, about 20 nanometers to about 30 nanometers, about 30 nanometers to about 40 nanometers, or greater than or equal to about 40 nanometers.

The catalytic metals may be present in the second catalyst composition portion in an amount up to about 50 mole percent (mol %). In one embodiment, the catalytic metals are present in the second catalyst composition portion in an amount in a range of from about 0.025 mol % to about 1 mol %, from about 1 mol % to about 5 mol %, from about 5 mol % to about 10 mol %, from about 10 mol % to about 15 mol %, from about 15 mol % to about 20 mol %, from about 20 mol % to about 30 mol %, from about 30 mol % to about 40 mol %, or greater than or equal to about 40 mol %.

One exemplary amount of catalytic metal in the second catalyst composition portion is about 1.5 mol %.

One exemplary amount of catalytic metal in the second catalyst composition portion is about 5 mol %.

The second catalyst composition portion may be used in an amount of up to about 90 wt %, based upon the total weight of the catalytic composition. In one embodiment, the second catalyst composition portion may be used in an amount in a range of from about 20 wt %, to about 30 wt %, from about 30 wt %, to about 40 wt %, from about 40 wt %, to about 50 wt %, from about 50 wt %, to about 60 wt %, from about 60 wt %, to about 70 wt %, from about 70 wt %, to about 80 wt %, or greater than about 80 wt %, based upon the total weight of the catalytic composition.

In one embodiment, a suitable solvent, a catalytic metal salt and a porous substrate are mixed together in a reaction vessel to produce the second catalyst composition portion. The catalytic metal salt may impregnate pores of the porous substrate by incipient wetness impregnation. The porous substrate may be filtered, washed, dried and calcined to yield the second catalyst composition portion such that the catalytic metal is disposed on a surface of the porous substrate. During the calcination process, the metal salt may reduce to a catalytic metal.

The first catalyst composition portion and the second catalyst composition portion may intimately mix to form the catalytic composition. A synergy may exist between the first catalyst composition portion and the second catalyst composition portion, which may affect the reduction reaction of NOx to nitrogen when compared with other comparative catalyst. The first catalyst composition may facilitate the conversion of long chain hydrocarbons ($C_5$ to $C_9$) into short chain hydrocarbons ($C_1$ to $C_4$). The short chain hydrocarbons may affect reduction efficiency.

A composition that may be useful as the second catalyst composition is disclosed in US published application 20110047995 (herein incorporated by reference in its entirety) and comprises a homogeneous solid mixture containing at least one catalytic metal and at least one metal inorganic support; wherein the pores of the solid mixture have an average diameter in a range of about 1 nanometer to about 15 nanometers; and at least one promoting metal. In one embodiment, the catalytic metal may include one or more of alkali metals, alkaline earth metals, and transition metals. Suitable metals that may be used as the catalytic metal may include silver, platinum, gold, palladium, iron, nickel, cobalt, gallium, indium, ruthenium, rhodium, osmium, iridium, or combinations of at least two of the foregoing metals. In one embodiment, the catalytic metal is selected from one or more of gallium, indium, and silver. In one embodiment, the catalytic metal is silver.

In one embodiment, the metal inorganic support has pores. The porous metal inorganic support is a reaction product of a reactive solution, a solvent, a modifier and a templating agent. A method includes mixing a reactive solution and a templating agent to form a gel; and calcining the gel to form a porous metal inorganic support that is capable of supporting a catalyst composition.

The metal inorganic support may be manufactured via a process, as described in U.S. Pat. No. 8,530,369 which is incorporated by reference herein in its entirety.

In one embodiment, the average pore size of the metal inorganic support is controlled and selected to reduce or eliminate poisoning. Poisoning may affect catalytic ability, and may be by aromatic species present in the reductant or in the exhaust gas stream. The porous material described herein is more resistant to poisoning from an aromatic containing reductant than a baseline typical gamma phase alumina impregnated with silver.

In a method of using the composition, the composition is disposed in the exhaust stream of an internal combustion engine. The internal combustion engine may be part of a variety of mobile or fixed assets, for example an automobile, locomotive, or power generator. Because different engines have different combustion characteristics the exhaust stream components differ from one system to another. Such differences may include variations in NOx levels, sulfur presence, and the presence or quantity of other species of reaction product. Changes in the operating parameters of the engine may also alter the exhaust flow characteristics. Examples of differing operating parameters may include temperature and flow rate. The catalyst may be used to reduce NOx to nitrogen and oxygen at a desirable rate and at a desirable temperature appropriate for the given system and operating parameters. The composition may be disposed in the exhaust gas path either in powdered form, in the form of an extruded monolith, or as a washcoated substrate. Various techniques for creating such powder beds, extrudates, or coated substrates are know in the art, and may be applied as appropriate for the desired composition and catalyst form.

During operation, the composition can convert the NOx present in an exhaust stream by about 90 weight percent. In one embodiment, the composition can convert the NOx present in an exhaust stream in an amount in a range of from about 10 weight percent to about 20 weight percent, from about 20 weight percent to about 30 weight percent, from about 30 weight percent to about 40 weight percent, from about 40 weight percent to about 50 weight percent, from about 50 weight percent to about 60 weight percent, from about 60 weight percent to about 70 weight percent, or greater than or equal to about 70 weight percent.

The following examples illustrate methods and embodiments in accordance with exemplary embodiments, and as such should not be construed as imposing limitations upon the claims. Unless specified otherwise, all components are commercially available from common chemical suppliers such as Alpha Aesar, Inc. (Ward Hill, Mass.), Spectrum Chemical Mfg. Corp. (Gardena, Calif.), and the like.

EXAMPLES

Example 1

The composition is manufactured by mixing a first catalyst composition portion including ferrierite with a second catalyst composition portion including 2 wt % silver disposed on an alumina porous substrate. The second catalyst composition portion is mixed with the first catalyst composition portion in a weight ratio of 4:1.

Figure 1:
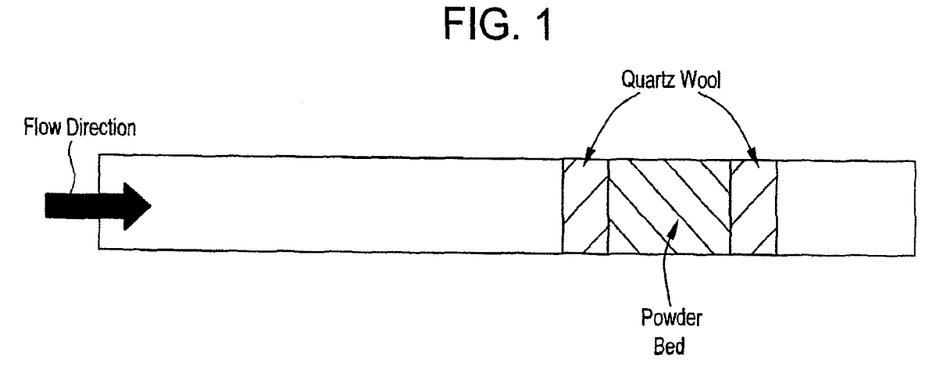
FIG. 1 is a schematic diagram depicting the furnace set-up of Example 1.

To determine the NOx reducing capabilities of the composition, it is placed in a furnace between two plugs of quartz wool as shown in FIG. 1.

Example 2

A simulated exhaust stream is discharged into a furnace containing the composition as described in Example 1. The flow of the simulated exhaust stream through the furnace is 3 standard liters per minute. In various tests, the simulated exhaust stream contained nitric oxide in amounts of 475, 610 and 690 parts per million and carbon monoxide in amounts of 250 parts per million. The carbon to nitrogen ratio is set at 6:1. The hydrogen content is 0 parts per million. The water content is set at 7 wt %. The sulfur dioxide and carbon dioxide content is each 0 parts per million. The temperatures in the furnace during the respective experiments are 275, 375 and 430 degrees Celsius. The WSSV (weight specific space velocity) is 674 liters per gram per hour (L/g/hr).

During the flow of the simulated exhaust stream through the furnace a reductant is introduced into the furnace. The reductant included a 1:1 weight mixture of a C8 blend and a C2-C3 blend. The C8 blend included 64 wt % trimethylpentane, 29 wt % toluene and 7 wt % octane. The C2-C3 blend includes 54 wt % ethylene and 46 wt % propylene.

Figure 2:
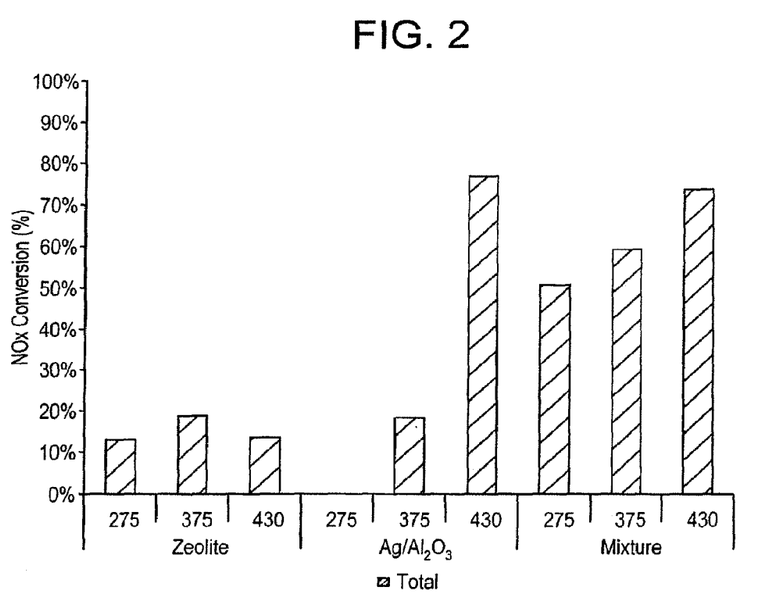
FIG. 2 is a bar graph that shows NOx conversion at various temperatures in the furnace configuration shown in FIG. 1.

The catalytic composition is tested against two comparative compositions. The first comparative composition contained just the first catalyst composition portion (i.e., just the ferrierite), while the second comparative composition contained just the second catalyst composition portions (i.e., just the silver disposed upon porous alumina). The results for the composition and the two comparative compositions are shown in FIG. 2. FIG. 2 is a bar graph that shows NOx conversion at various temperatures in the furnace.

From the results it can be seen that the composition including the mixture of the first catalyst composition portion and the second catalyst composition portion is superior to either the first catalyst composition portion or the second catalyst composition portion. At the respective furnace temperatures of 275, 375 or 430 degrees Celsius, the composition converts an amount of greater than or equal to about 50% of the NOx contained in the simulated exhaust stream. At temperatures of 275 or 375 degrees Celsius the first catalyst composition portion or the second catalyst composition portion showed an ability to convert less than 20 wt % of the NOx present in the simulated exhaust stream. Only at 430 degrees Celsius, did the second catalyst composition portion show an ability to convert about 75 wt % of the NOx present in the simulated exhaust stream.

These results demonstrate the synergistic capabilities of the first catalyst composition portion and the second catalyst composition portion to reduce NOx present in an exhaust stream more effectively when mixed than when separate. This synergy is especially apparent at lower temperatures, such as the lower tested temperatures of 275 to 375 degrees Celsius.

Example 3

This example compares the ability to chemically reduce NOx between a first composition (Sample X) in which the first and second catalyst composition portions are intimately mixed together and a second material (Sample Y) in which the first and second catalyst composition portions are not mixed. The configuration of the furnace is shown in FIG. 3(a) and FIG. 3(b), respectively.

Figure 3A:
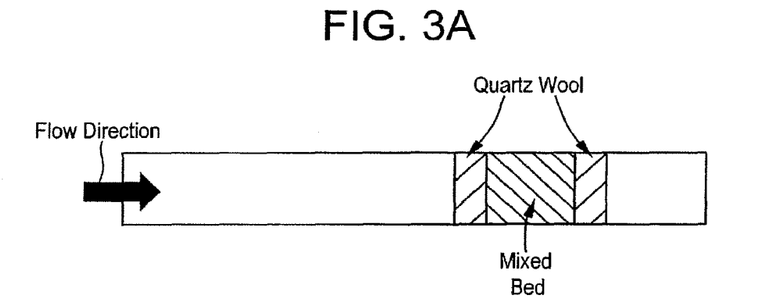
FIG. 3(a) is a schematic diagram depicting a furnace set-up of Example 3.

As shown in FIG. 3(a), Sample X is tested by placing a single bed containing the composition between two plugs of quartz wool. FIG. 3(b) shows the first catalyst composition portion and the second catalyst composition portion being placed in a dual bed configuration with each catalyst composition disposed between two plugs of quartz wool. The ferrierite (i.e., first catalyst composition portion) is placed downstream of the silver disposed on the alumina (i.e., the second catalyst composition portion). The remaining test conditions are the same as detailed in the Example 1.

Figure 3B:
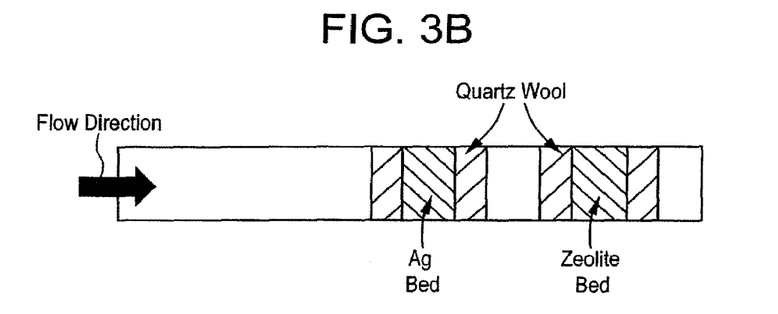
FIG. 3(b) is a schematic diagram depicting the furnace set-up of Example 3.
Figure 4:
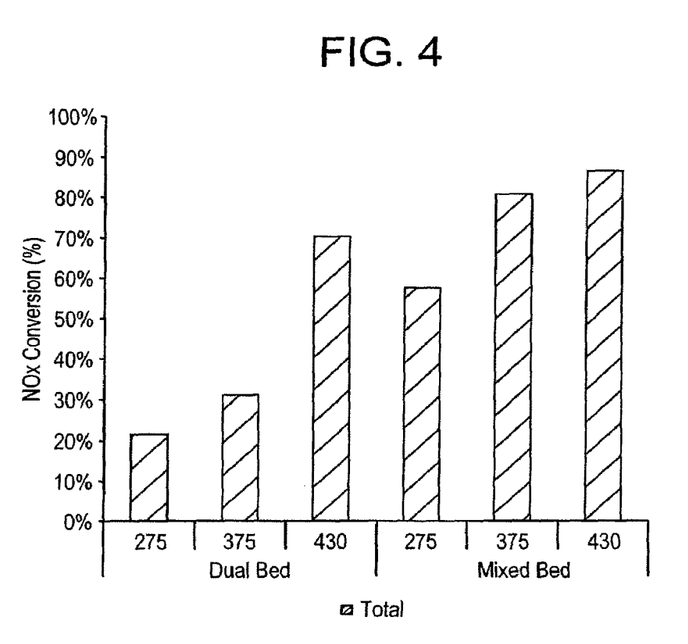
FIG. 4 is a bar graph that shows NOx conversion at various temperatures in the furnace for the configurations of Example 3.

The results are shown in FIG. 4. as a bar graph that shows NOx conversion at the different temperatures for the system of FIG. 3(a) in intimate mixture form (the mixed, single bed configuration) and the system of FIG. 3(b) (the dual bed configuration). From FIG. 4, it may be seen that at all the tested temperatures and operating regimes, the composition displayed a superior NOx conversion capability when used in a mixed bed configuration.

Example 4

This example demonstrates the NOx reducing capabilities of the catalytic composition. The example also demonstrates the NOx reducing capabilities of the catalytic composition when the first catalyst composition portion and the second catalyst composition portion are used in different weight ratios. The reductants selected for Example 3 are octane, Moctane (which includes 5 wt % of 2,4-dimethylhexane, 3 wt % of 3,4-dimethylhexane, 54 wt % of 2,2,4-trimethylpentane, 10 wt % octane and 29 wt % toluene), C1-C3, which includes methane, ethylene and propylene in amounts of 5500 ppm, 30,900 ppm and 27,500 ppm respectively. A Moctane/C1-C3 blend is the reductant. The weight ratio of Moctane to the C1-C3 is 1:1 based on the carbon present in the exhaust stream.

A simulated exhaust stream having a carbon to nitrogen ratio of 8 is used to determine NOx reduction in the furnace. The respective catalysts are inserted into the furnace in amounts of 25-36 grams. The nitrogen oxide content in the simulated exhaust gas stream is 600 ppm. The sulfur dioxide content is 1 ppm. The water content is 7 weight percent and the oxygen content is 13 weight percent with the balance being nitrogen. The WSSV (weight specific space velocity) for this example was 67-96 L/g/hr. The results are shown in the Table 3 below.

From Table 3, it can be seen that the catalytic composition containing the first catalyst composition portion (ferrierite) and the second catalyst composition portion (2 wt % silver on alumina) in a ratio of 1:4 produces superior NOx conversion results at all temperatures when C1-C3 and a Moctane/C1-C3 blend is the reductant.

TABLE 3

| Reductant | Octane | | | Moctane | | |
|---|---|---|---|---|---|---|
| Temperature (° C.) | 275 | 325 | 425 | 275 | 325 | 425 |
| Catalyst Composition | | | | | | |
| 2% Ag/Al$_2$O$_3$ | 10 | 95 | 60 | 11 | 43 | 83 |
| Ferrierite | 2 | 4 | 12 | 2 | 4 | 10 |
| 2% Ag/Al$_2$O$_3$ followed by Ferrierite (dual bed) | 15 | 95 | 41 | 1 | 10 | 30 |
| Ferrierite followed by 2% Ag/Al$_2$O$_3$ (dual bed) | 11 | 95 | 60 | 1 | 15 | 35 |
| Mixed 2% Ag/Al$_2$O$_3$ and Ferrierite (weight ratio 1:4) | 0 | 21 | 51 | 0 | 10 | 21 |
| Mixed 2% Ag/Al$_2$O$_3$ and Ferrierite (weight ratio 2:3) | 0 | 52 | 60 | 0 | 18 | 43 |
| Mixed 2% Ag/Al$_2$O$_3$ and Ferrierite (weight ratio 1:1) | 0 | 95 | 70 | 0 | 29 | 64 |
| Mixed 2% Ag/Al$_2$O$_3$ and Ferrierite (weight ratio 3:2) | 0 | 90 | 65 | 0 | 28 | 63 |
| Mixed 2% Ag/Al$_2$O$_3$ and Ferrierite (weight ratio 4:1) | 20 | 90 | 74 | 5 | 45 | 78 |

TABLE 3-continued

| Al$_2$O$_3$ | 2 | 5 | 20 | 1 | 2 | 3 |
|---|---|---|---|---|---|---|
| Reductant | | C1-C3 | | | Moctane/C1-C3 | |
| Temperature (° C.) | 275 | 325 | 425 | 275 | 325 | 425 |
| Catalyst Composition | | | | | | |
| 2% Ag/Al$_2$O$_3$ | 2 | 10 | 29 | 11 | 20 | 50 |
| Ferrierite | 28 | 13 | 5 | 13 | 12 | 11 |
| 2% Ag/Al$_2$O$_3$ followed by Ferrierite (dual bed) | 33 | 45 | 46 | 22 | 38 | 50 |
| Ferrierite followed by 2% Ag/Al$_2$O$_3$ (dual bed) | 14 | 39 | 48 | 13 | 31 | 47 |
| Mixed 2% Ag/Al$_2$O$_3$ and Ferrierite (weight ratio 1:4) | 15 | 38 | 45 | 20 | 33 | 40 |
| Mixed 2% Ag/Al$_2$O$_3$ and Ferrierite (weight ratio 2:3) | 28 | 70 | 70 | 28 | 48 | 53 |
| Mixed 2% Ag/Al$_2$O$_3$ and Ferrierite (weight ratio 1:1) | 44 | 88 | 82 | 31 | 65 | 65 |
| Mixed 2% Ag/Al$_2$O$_3$ and Ferrierite (weight ratio 3:2) | 43 | 83 | 78 | 28 | 58 | 60 |
| Mixed 2% Ag/Al$_2$O$_3$ and Ferrierite (weight ratio 4:1) | 75 | 80 | 75 | 48 | 61 | 65 |
| Al$_2$O$_3$ | 1 | 2 | 4 | 1 | 2 | 4 |

From the above experiments, the catalytic composition can convert up to 90 weight percent of the NOx present in an exhaust stream.

Example 5

A further exemplary test was performed with four catalytic configurations. The first configuration 110 has a dual bed configuration (as shown in FIG. 3(b)) with a first catalytic material being a copper-based zeolite in a bed disposed downstream of a second catalytic material containing a metal disposed upon a supporting substrate, specifically, silver on a templated alumina substrate. The second configuration 120 is identical but substitutes an iron-based zeolite for the copper-based zeolite in the first configuration. In both configurations, the ratio of the second catalytic material to the first by mass is 2:1. The third configuration 130 uses a single, mixed bed as shown in FIG. 3(a) with mixture of the first and second catalytic materials. The first catalytic material used in this configuration is a zeolite that is intimately mixed with a silver catalyst in a 1:16 mass ratio. The fourth configuration 140 uses a single bed of silver over templated alumina as the only catalytic material, configured as shown in FIG. 3(a).

The four configurations were exposed to simulated exhaust streams containing 300 ppm NO, 7% H$_2$O by mass, 9% O$_2$ by mass, 0 ppm SO$_2$ and 0 ppm CO. Tests were run for 1 hours at each configuration for exhaust stream temperatures of 300 Celsius, 350 Celsius, 400 Celsius, and 450 Celsius.

Figure 5:
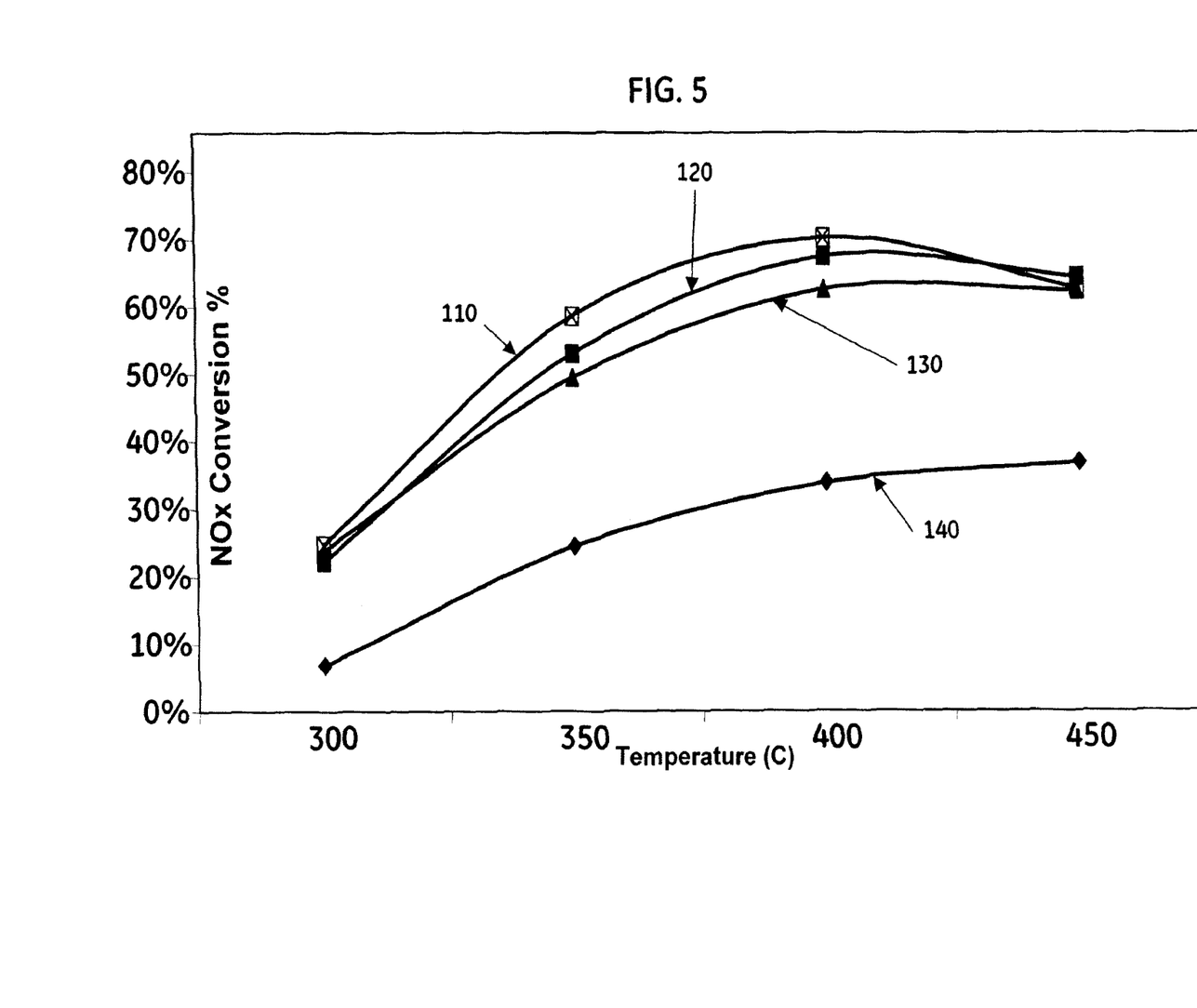
FIG. 5 shows graphs indicating the NOx conversion performance at various temperatures for four configurations discussed in Example 5.

Reductant in the form of 1500 ppm of C$_1$ ultra-low Sulfur Diesel (ULSD) was added to the stream. Results for these exemplary test conditions are shown in FIG. 5. Although separate beds of the first and second catalytic materials performed slightly better at interim temperature ranges, it can be seen that at low temperature (i.e., startup), and at high temperature (i.e., operating conditions), the performance of the mixed bed in the third configuration was comparable to that of the dual beds of the first and second configurations. All other configurations were superior to the fourth configuration at NOx reduction at all tested temperatures.

In addition to the NOx reduction illustrated, secondary emissions of NH$_3$, HCN, N$_2$O and formaldehyde were also favorably reduced by the use of the mixed bed (third catalyst configuration) compared to the others. In particular, NH$_3$ and N$_2$O reduction by the mixed bed was superior or comparable in all tested conditions. HCN and formaldehyde emissions were comparable at higher operating temperatures as well as being superior at lower operating temperatures.

Example 6

Figure 6:
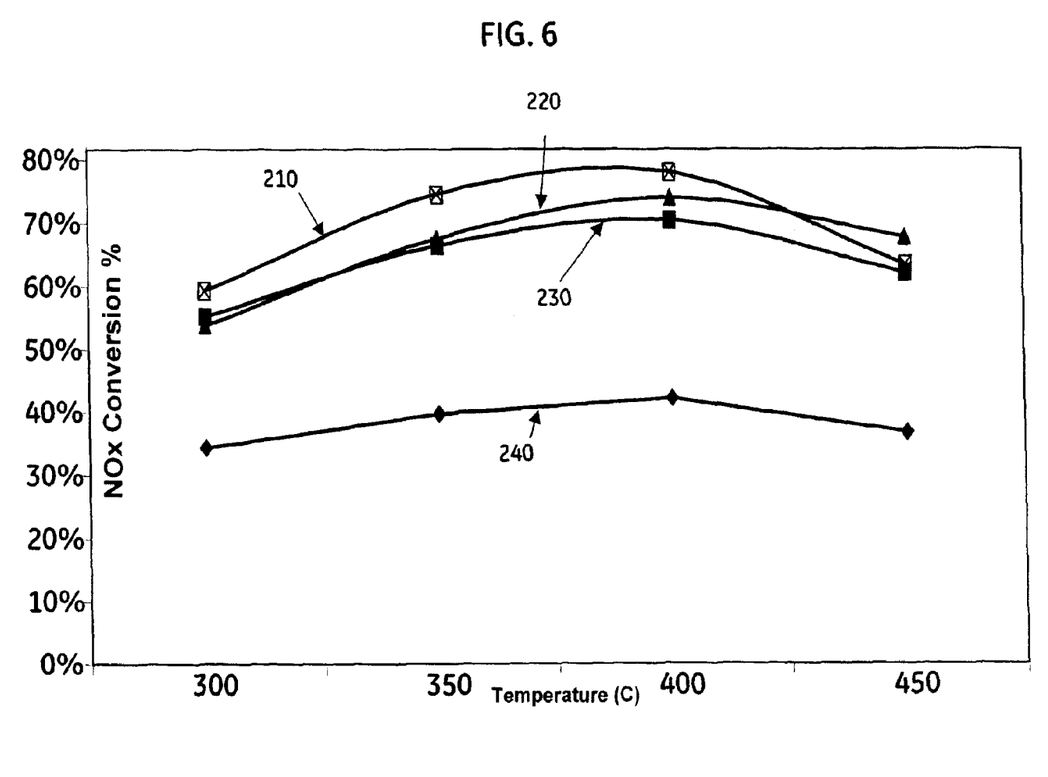
FIG. 6 shows graphs indicating the NOx conversion performance at various temperatures for four configurations discussed in Example 6.

In another exemplary test, the same four configurations of Example 5 were tested under identical test conditions, but with an additional reductant added to the simulated exhaust stream: 1000 ppm of H$_2$. Results are shown for the first configuration 210, second configuration 220, third configuration 230 and fourth configuration 240 under these operating conditions. As can be seen from the results (shown in FIG. 6), the single, mixed bed configuration was comparable over most of the operating range to the NOx reduction results found in the dual bed configurations.

The following examples illustrate methods of preparing porous alumina with silver and H-ferrierite disclosed in US published application 20110047995, herein incorporated by reference in its entirety herein.

Example 7

Preparation of Porous Alumina with Silver

A 100 gallon reactor equipped with a stirrer was charged with: isopropyl alcohol (72 kilograms), ethylacetoacetate (936 grams), triton X114 (3.12 kilograms) and Aluminum (sec-butoxide)$_3$ (18 kilograms). The resultant mixture was stirred for about 30 minutes, at a temperature of about 28 degrees Celsius to form a first solution. In another separate flask, silver nitrate (290.4 grams) was dissolved in water (2.64 liters) and then isopropyl alcohol (22 kilograms) was added to form a second solution. The second solution was added to the first solution at an addition rate of about 180 milliliters per minute. An increase in temperature to about 35 degrees Celsius was noted after the addition. The resultant solution was stirred at 28 degrees Celsius for another 2.5 hours. The solution was then heated to reflux. The solution was stirred (stirring rate of 120 revolutions per minute) and maintained at reflux for a period of about 36 hours.

The resultant solution was spray dried at a temperature of about 100 degrees Celsius to remove the solvents to provide a powder with a yield of over 80 percent, and having an average particle size diameter of less than about 10 microns. The spray dried powder was then further processed in two steps, (i) pyrolysis and (ii) calcination. The two step process was performed to remove the organic components Triton X114, ethyl acetoacetate, and isopropyl alcohol, without exposing the powder to the temperature rise equivalent to combustion of the organic components.

For step (i) pyrolysis, the powder was loaded in multiple batches, into two quartz boats, in a 6 inch quartz tube, in a 5 feet long tube furnace. Each boat held approximately 1 kilogram of spray dried powder. 20 standard cubic feet per hour of nitrogen ($N_2$) was fed to the tube. The furnace was then heated following the heating profile: heated to 100 degrees Celsius at a rate of 5 degrees Celsius per minute, maintained for 3 hours, heated to 550 degrees Celsius at 2 degrees Celsius per minute, maintained for 6 hours, and then the furnace was cooled to 28 degrees Celsius at the natural cooling rate of the furnace using convection cooling. The heating resulted in either the evaporation of the organics, or their decomposition into lighter components or carbonaceous material. During the pyrolysis process, the powder lost about 50-55 percent of its mass and roughly 50 percent of its volume. This process was repeated in several batches to pyrolyze all of the spray dried pyrolyzed powder.

The (i) pyrolysis step was followed by a (ii) calcination step in order to remove any residual carbonaceous material and fully oxidize any remaining hydroxyls. The pyrolyzed powder was loaded into multiple alumina boats that were stacked in a muffle furnace in air (CM Furnace having a capacity around 216 cubic inches). The furnace was heated to 600 degrees Celsius at a rate of 1 degree Celsius per minute, and maintained at this temperature for about 3 hours, followed by cooling the furnace to 28 degrees Celsius at the natural cooling rate of the furnace using convection cooling. During the calcination process, the powder lost approximately about 10 percent of its mass based on the pyrolyzed powder, resulting in an approximate 60 percent mass loss based on the original spray dried powder. This process was repeated in several batches to calcine the spray dried pyrolyzed powder. The resultant powder had a surface area of about 336 square meters per gram, a pore diameter of about 39.6 Angstroms and a pore volume of about 0.42 cubic centimeter per gram.

Example 8

Preparation of Monolith Coated with Porous Alumina with Silver

A slurry was prepared in isopropyl alcohol using the porous alumina with silver prepared in Example 7. The slurry comprised 25 weight percent porous alumina with silver in isopropyl alcohol. The resultant slurry was mixed in a Planetary Centrifugal Mixer (Thinky, capacity 310 cubic centimeters) for about 30 seconds and then ultrasonically milled for about 5 minutes. The slurry turned chocolate milk brown. The slurry was wash coated onto a cordierite monolith having a dimension of 6.23 milliliters bulk volume by dipcoating. The coated cordierite monolith was then calcined at 550 degrees Celsius for about 4 hours to obtain a white colored catalyst comprising silver and alumina washcoated on the cordierite monolith. Weight of porous alumina with silver was 0.81 grams on cordierite monolith initially weighing 3.18 grams.

Example 9

Preparation of H-Ferrierite 100 grams of Ferrierite zeolite $NH_4$ ($CP_{914}C$) obtained from Zeolyst International (Valley Forge, Pa.) was calcined in a quartz tube furnace in order to convert the ferrierite to its H form. The powder was calcined using a dry feed at 6 standard cubic feet per hour in a 3 inch internal diameter, 4 feet long quartz furnace. The ferrierite powder material was soaked in nitrogen and the resultant mixture was heated at 5 degrees Celsius per minute to a temperature of 110 degrees Celsius, and the mixture was maintained at 10 degrees Celsius for 1 hour. The resultant material was then heated to 550 degrees Celsius at a rate of 2 degrees Celsius per minute and maintained at 550 degrees Celsius for 1 hour in nitrogen atmosphere. The gas was switched from nitrogen to air and the resultant material was maintained for additional 4 hours under an atmosphere of air. The resultant powder was cooled at a rate of 5 degrees Celsius per minute to about 28 degrees Celsius under an atmosphere of air to provide H-Ferrierite.

As a matter of definition, the term "diesel" refers to the distillate commonly available to operate in a diesel engine. While those of skill in the art will recognize that diesel fuel may vary in its precise mixture, that the term diesel encompasses all such varieties in mixture commonly available. This may include diesel fuel derived from a variety of sources, including for example, bio-diesel and petro-diesel. Ultra-low Sulfur Diesel refers to specific blends of diesel fuel commonly used in automotive engines that have very low sulfur levels. Similarly, the term "gasoline" is used to refer to any of the blends of distillate commonly available to operate in a gasoline engine.

While the systems and techniques herein have been described with reference to exemplary embodiments, it will be understood by those skilled in the art that various changes may be made and equivalents may be substituted for elements thereof without departing from their essential scope. In addition, many modifications may be made to adapt a particular situation or material to the teachings of a given embodiment without departing from the essential scope thereof. Therefore, it is intended that these systems and techniques are not limited to the particular embodiments disclosed as the best mode contemplated for carrying them out.

The various embodiments described herein may be examples of catalytic compositions and systems using such compositions and techniques for manufacturing these embodiments. Any given embodiment may provide one or more of the advantages recited, but need not provide all objects or advantages recited for any other embodiment. Those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description may enable those of ordinary skill in the art to make and use embodiments having alternative elements that likewise correspond to the elements recited herein. While only certain features and embodiments have been illustrated and described herein, many modifications and changes may occur to one of ordinary skill in the relevant art. Thus, it is intended that the scope of the invention disclosed should not be limited by the particular disclosed embodiments described above, but should be determined only by a fair reading of the claims that follow.

The invention claimed is:

1. A catalytic system for the conversion of nitrogen oxides in exhaust gases comprising an intimate mixture comprised of:
   a first catalyst composition comprised of particles of a ferrierite that contains no metal ions and is not doped with a metal, and
   a second catalyst composition comprised of Ag on porous $Al_2O_3$ particles,
wherein the ferrierite particles of the first catalyst composition are mixed with the particles of the second catalyst composition forming the intimate mixture in which the ferrierite particles are in contact with particles of the second catalyst composition in a weight ratio of ferrierite particles to second catalyst composition particles so that the catalyst system is capable of reducing the concentration of nitrogen oxide in the exhaust gases by between 15 weight percent to 90 weight percent at temperatures between 275° C. to 500° C.

2. The system as defined in claim 1, wherein the ferrierite has a silicon to aluminum weight ratio in a range of from about 10 to about 30.

3. The system as defined in claim 1, wherein the ferrierite has a surface area in a range of from about 200 m²/gm to about 500 m²/gm.

4. The system as defined in claim 1, wherein the first catalyst composition is present in an amount in a range of from about 1 to about 80 weight percent, based upon the total weight of the first catalytic composition and the second catalytic composition.

5. The system as defined in claim 4, wherein the first catalyst is present in an amount in a range from about 3.5 to about 8 weight percent, based upon the total weight of the first catalytic composition and the second catalytic composition.

6. The system as defined in claim 1, wherein the mixture is supported on a monolith.

7. The system as defined in claim 1, wherein the mixture is present as a washcoat on a substrate.

8. A catalytic system according to claim 1, wherein the second catalyst composition is comprised of about 1 mol % Ag to about 5 mol % Ag on porous $Al_2O_3$ particles.

9. A catalytic system according to claim 8 wherein the second catalyst composition is comprised of about 2 wt % Ag on porous $Al_2O_3$ particles.

10. A catalytic system according to claim 1, wherein the ferrierite particles are in contact with particles of the second catalyst composition in a weight ratio of 1:4 to 4:1.

11. A catalytic system for the conversion of nitrogen oxides in exhaust gases comprising an intimate mixture comprised of:
   a first catalyst composition comprised of particles of a ferrierite that contains no metal ions and is not doped with a metal; and
   a second catalyst composition comprised of Ag on porous $Al_2O_3$ particles,
wherein the ferrierite particles of the first catalyst composition are mixed with the particles of the second catalyst composition forming the intimate mixture in which the ferrierite particles are in contact with particles of the second catalyst composition in a weight ratio of 1:4 to 4:1 so that the catalyst system is capable of reducing the concentration of nitrogen oxide in the exhaust gases by between 15 weight percent to 90 weight percent at temperatures between 275° C. to 500° C.

12. A catalytic system according to claim 11, wherein the second catalyst composition comprised of about 1 mol % Ag to about 5 mol % Ag on porous $Al_2O_3$ particles.

13. A catalytic system according to claim 12, wherein the second catalyst composition comprised of 2 mol % Ag on porous $Al_2O_3$ particles.

14. A catalytic system according to claim 13, wherein the ferrierite particles are in contact with particles of the second catalyst composition in a weight ratio of 1:4.

15. A catalytic system according to claim 11, wherein the catalyst system is capable of reducing the concentration of nitrogen oxide in the exhaust stream by between 15 weight percent to 90 weight percent at temperatures between 275° C. to 430° C.

16. A catalytic system according to claim 11, wherein the catalyst system is capable of reducing the concentration of nitrogen oxide in the exhaust stream by between 15 weight percent to 90 weight percent at temperatures between 275° C. to 375° C.

* * * * *